(12) United States Patent  
Seng

(10) Patent No.: US 9,358,826 B2
(45) Date of Patent: Jun. 7, 2016

(54) HOLE-LESS EDITABLE BINDING SYSTEM

(71) Applicant: Michael A. Seng, Portland, OR (US)

(72) Inventor: Michael A. Seng, Portland, OR (US)

(73) Assignee: Michael A. Seng, Portland, OR (US)

( * ) Notice: Subject to any disclaimer, the term of this patent is extended or adjusted under 35 U.S.C. 154(b) by 132 days.

(21) Appl. No.: 14/183,330

(22) Filed: Feb. 18, 2014

(65) Prior Publication Data

US 2014/0310926 A1   Oct. 23, 2014

Related U.S. Application Data

(60) Provisional application No. 61/767,116, filed on Feb. 20, 2013.

(51) Int. Cl.
*B42F 1/00* (2006.01)

(52) U.S. Cl.
CPC ... *B42F 1/00* (2013.01); *Y10T 24/20* (2015.01)

(58) Field of Classification Search
CPC .............. B42F 1/00; B42F 9/00; B42F 9/007; Y10T 24/20; Y10T 24/201
USPC .................................... 402/45; 24/67 R, 67.1
See application file for complete search history.

(56) References Cited

U.S. PATENT DOCUMENTS

| | | | | | |
|---|---|---|---|---|---|
| 395,771 | A * | 1/1889 | Crane | .................. | B42F 9/00 206/215 |
| 418,815 | A * | 1/1890 | Ogden | .................. | B42F 9/00 24/67.1 |
| 729,763 | A * | 6/1903 | Hartman | .................. | B42F 13/00 402/53 |
| 857,100 | A * | 6/1907 | Norman | .................. | B42F 9/00 24/67.1 |
| 971,294 | A * | 9/1910 | McBee | .................. | B42F 9/00 24/67.1 |
| 1,430,366 | A * | 9/1922 | Fleck | .................. | B42F 9/00 24/67.1 |
| 1,611,676 | A * | 12/1926 | Prickitt | .................. | B42D 5/006 24/67.1 |
| 1,753,366 | A * | 4/1930 | De Lisle | .................. | B42F 15/0011 211/46 |
| 1,828,600 | A * | 10/1931 | Finley | .................. | B42F 9/00 24/67.1 |
| 2,120,086 | A * | 6/1938 | Brown | .................. | B42F 9/00 24/67 R |
| 4,991,990 | A * | 2/1991 | Frank | .................. | B42F 13/30 402/53 |
| 5,690,443 | A * | 11/1997 | Sullivan | .................. | B42F 13/14 402/60 |
| 7,120,968 | B2 * | 10/2006 | Huene | .................. | B42F 13/12 24/16 R |
| 2010/0209176 | A1 * | 8/2010 | Okamura | .................. | B42F 1/00 402/60 |

OTHER PUBLICATIONS

Brad Isaac, "Fun and Easy How to Guide to Binding Your Own Paperback Books at Home . . . FAST", http://www.persistenceunlimited.com/2006/03/fun-and-easy-how-to-guide-to-binding-your-own-paperback-books-at-homefast/, Mar. 20, 2006.*

* cited by examiner

*Primary Examiner* — Joshua Kennedy

(57) ABSTRACT

A system for externally binding flat media by hand for presentation purposes without a need for creating a spine, hole-punching paper, permanent covers or insertion into pre-constructed sleeves. It employs a slim, external bar, placed in the margin area on the front side of a flat media stack and a rigid backing board on the rear side. The entire assembly is held together firmly by threaded bolts and adjoining screw posts that are adjusted depending upon the quantity of sheets included and their thicknesses. The stack is compressed and decompressed by tightening or loosening the threaded bolts whenever sheets are added or removed. The low-profile system firmly grips sheets with unlikely slippage, requires no heat or adhesives, and provides the ease of turning the pages or sheets as typical in a perfect-bound book. It accommodates common lengths of paper stock and fabric swatches, and multiple thicknesses within the same stack.

14 Claims, 6 Drawing Sheets

HOLE-LESS EDITABLE BINDING SYSTEM

CONTINUITY AND CLAIM OF PRIORITY

This is an original U.S. patent application which claims priority to U.S. provisional patent application No. 61/767,116 filed 20 Feb. 2013.

BACKGROUND

This utility invention relates to a method of easily and tightly binding stacks of loose-leaf paper or other flat media for editable presentation purposes by hand. Particularly, this invention eliminates the need to punch holes in paper, include a spine or use sleeve inserts. It secures the paper or fabric stack neatly in place while transporting or displaying documents, fabric or artwork. It allows for customized covers and back covers or backing boards. The assembly can also be used as an easel.

BRIEF DESCRIPTION OF PRIOR ART

In prior patents of editable presentation book binding systems, channels often are made through the printed media, typically for insertion of bolts and binder rings, hence the task of manual hole-punching or using a hole-punching device is necessary. Such systems add extra steps and financial costs in creating a book or portfolio. A ring binder must always be opened each time an insert is added or deleted creating the chance for human error, damage to the paper as well as bodily injury. Hole-punched adhesive strips are available to attach to loose-leaf paper though these are costly, time consuming and must be discarded whenever the attached sheet is discarded. Other times, there are metal spring-tension clamps or clips that hold the paper stack from the sides or tops of the pages. These devices are often less streamlined as needed for artistic portfolios, consume needed space and provide inadequate pressure allowing the inserts to shift in transport or when being handled. They are sometimes complex mechanisms that are distracting from the artwork and other documents, do not adequately hold material in place or snag other materials. There is also a ratchet binding system that applies pressure though isn't streamlined and is as permanent as traditional bookbinding. It is also not editable. Many flimsy binding methods exist that are unsuitable for larger documents, heavy weight paper stock, fabrics, leather or larger paper stacks. Often, various binding devices are internal and/or do not allow for custom covers or backing support boards.

BRIEF SUMMARY OF INVENTION

This invention is a system for externally binding a stack of loose-leaf paper, fabric or other flat media for presentation purposes, without the need for creating a spine, holepunching paper, permanent covers or insertion into pre-constructed sleeves. It employs the use of a slim, external bar constructed of dense material and is placed in the margin area on the front side of a paper stack and a rigid backing board on the rear side. The entire assembly is held together firmly with threaded bolts and adjoining screw posts that can be adjusted depending upon how many paper sheets are included and their thicknesses. The paper stack is compressed and decompressed by tightening or loosening the threaded bolts whenever pages are added or removed. Multiple length threaded bolts and screw posts can be interchanged as needed to allow for varying thicknesses of paper stacks, backing boards, backing board designs and various types and thicknesses of cosmetic/decorative covers. Various backing board thickness may also be employed to add or delete necessary spacing.

The system firmly grips paper or fabric with unlikely slippage, requires no heat or adhesives, and provides the ease of turning the pages or sheets as typical in a perfect bound book. It accommodates common lengths of paper stock and fabric swatches, and multiple thicknesses within the same stack.

REFERENCE NUMERALS IN THE DRAWINGS

Figure 1:
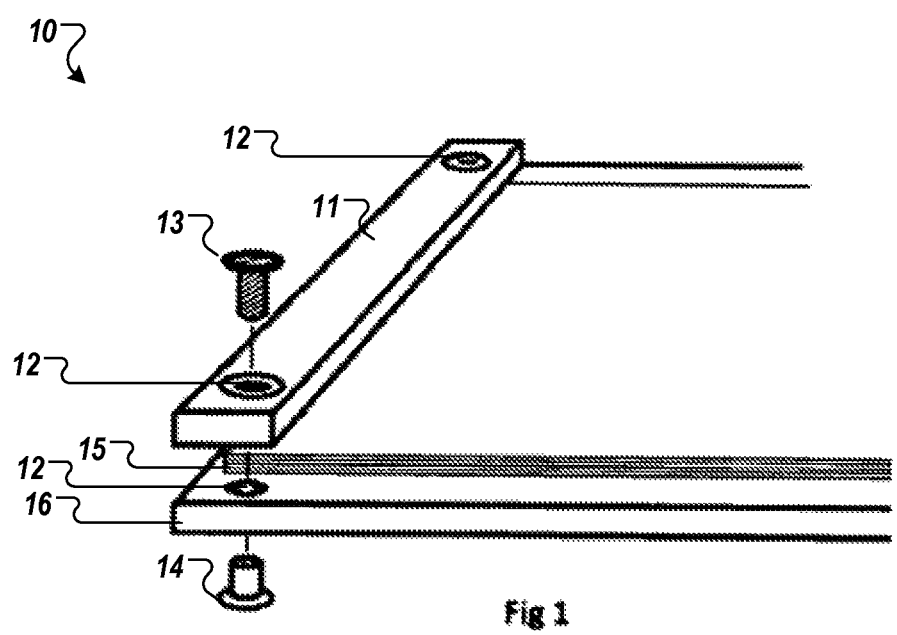
FIG. 1 shows an overhead perspective view of the entire binding system including the dense bar, top threaded bolt and lower screw post protruding from the bottom through the backing board. A paper or fabric stack is about to be sandwiched between the bar and backing board assembly.
Figure 2:
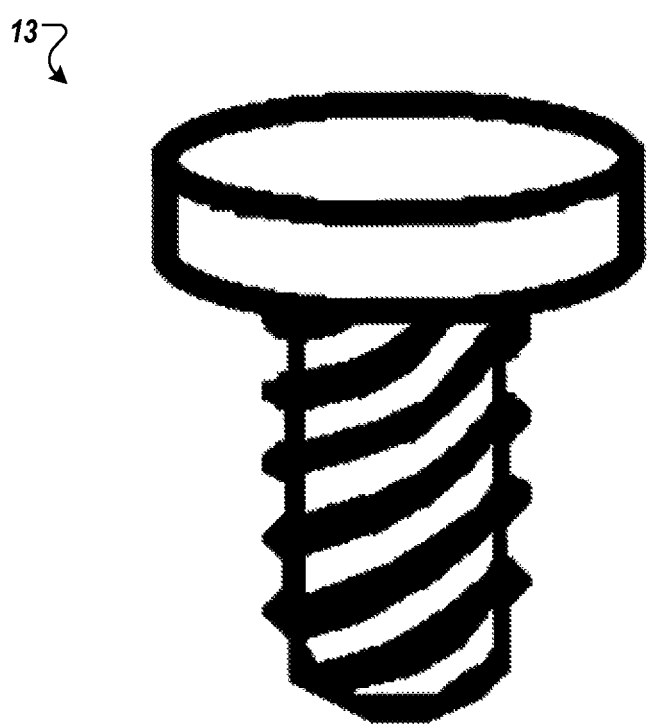
FIG. 2 shows an exploded perspective view of a threaded bolt that can be used in the through-holes of the bar from the top down into the screw post on the bottom.
Figure 3:
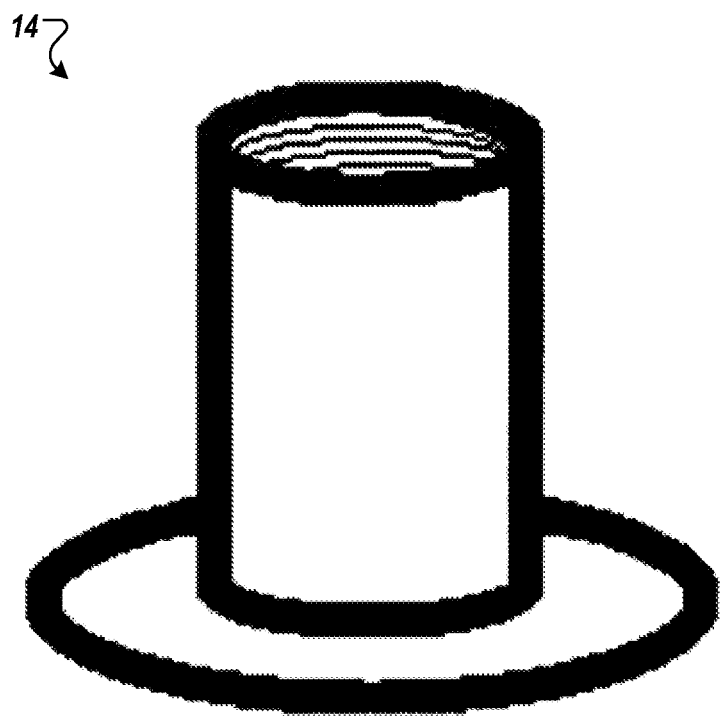
FIG. 3 shows an exploded perspective view of a screw post that can be used in the through-holes from the bottom of the backing board and connects to the top threaded bolt through the bar that resides above it.
Figure 4:
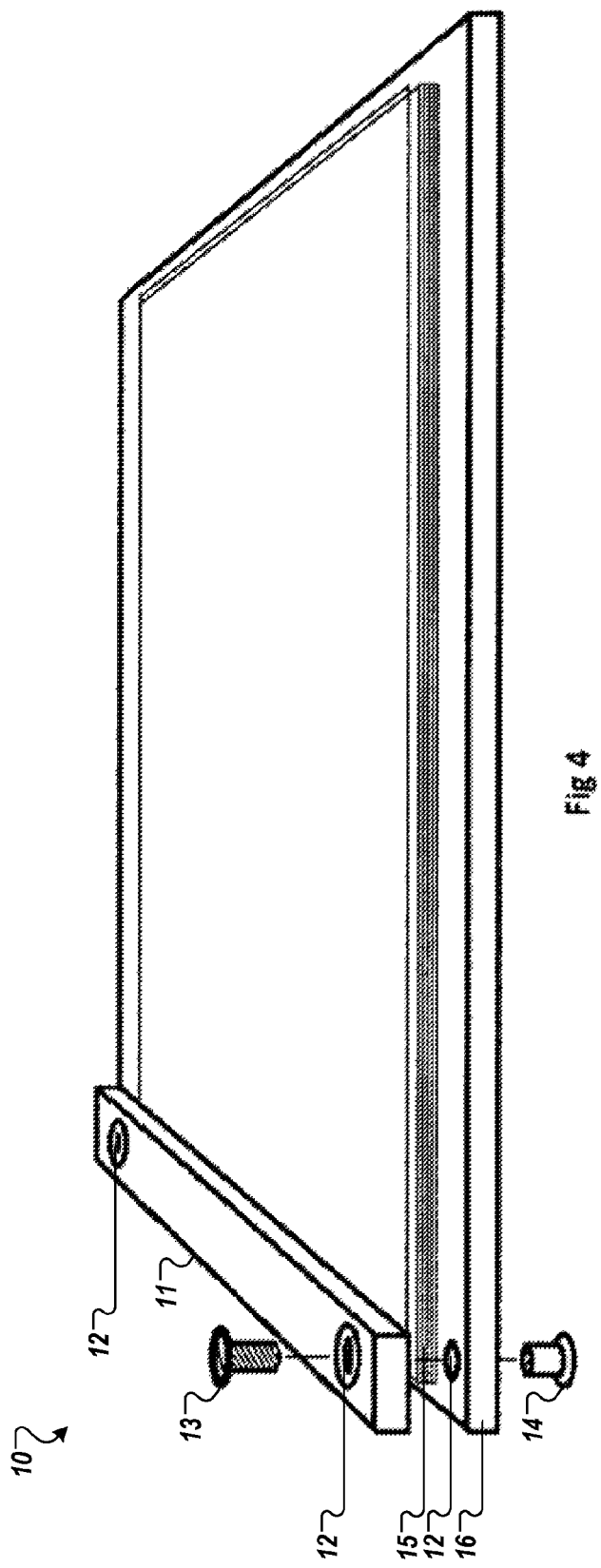
FIG. 4 shows the front perspective view of the open device. The screw post is inserted through a hole in the backing board and will securely hold the binding system once the top threaded bolt is inserted as deeply as needed.
Figure 5:
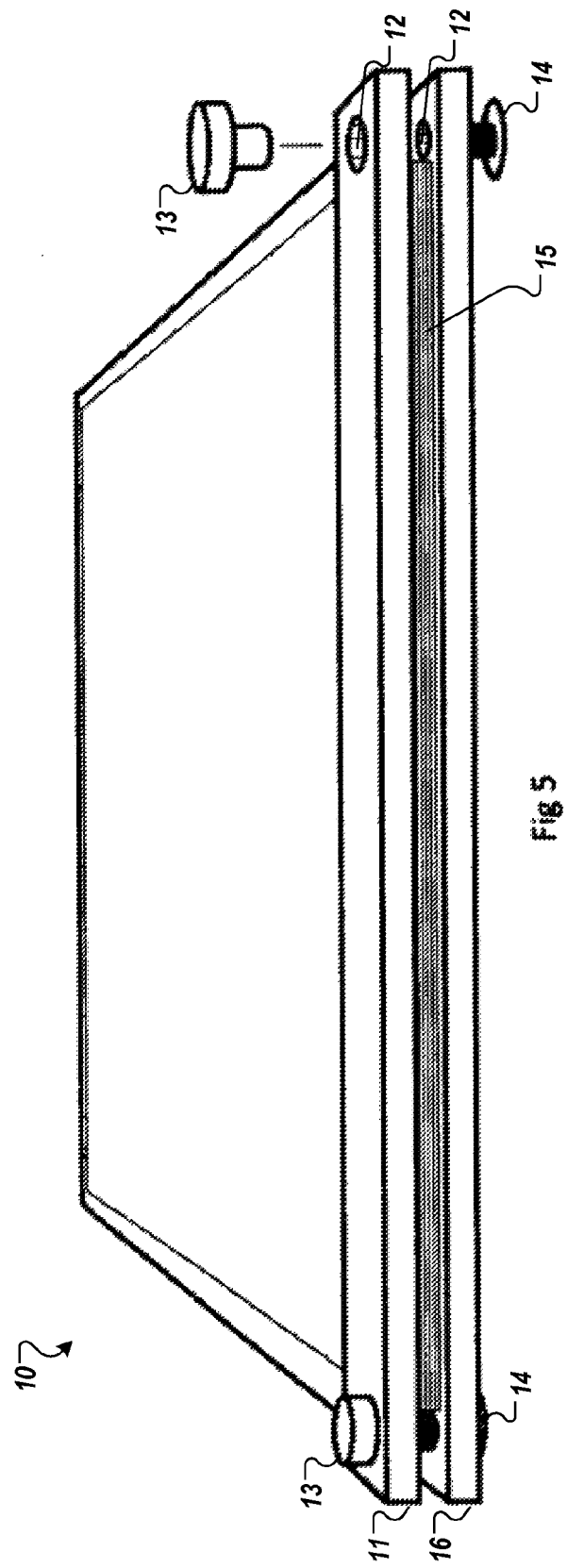
FIG. 5 shows a side perspective view of a paper or fabric stack tightly secured between the bar and the backing board by means of the threaded bolts and screw posts on either end. This board can be made of nearly any dense material that can have a hole bored through it.

10—Hole-less editable binding system
11—Dense bar
12—Channel through hole entry points
13—Threaded male bolt or screw
14—Threaded female screw post or socket
15—Flat material such as paper, fabric or leather
16—Dense backing board
17—Screw post barrel extender

DETAILED DESCRIPTION

A channel hole 12 is made at the top of both a dense bar 11 constructed from a high-density material such as metal, wood, bone or polymer. The bar 11 is placed along a paper or fabric stack 15 margin and again at the corresponding area of a dense material backing board 16. Another channel hole 12 is made at the bottom (opposite end) of both the same bar 11 and backing board 16.

Threaded bolts 13 and screw posts 14 are inserted through the channels 12. The screw post assembly is hand-fastened as far down/in as necessary while allowing generous room for the paper or fabric stack 15 that is to be inserted. The edge of the paper or fabric stack 15 is then inserted under the long end of the bar 11 through the gap between the two screw posts 14 where they will be held neatly and securely. The stack 15 is aligned flush against the long edge of the bar 11 and a dense backing board 16. Finer adjustments of the screw post 14 heads are made to bear down tightly on the paper or fabric stack 15. The placement of the screw heads on either end of the bar 11 ensures an even and consistent inward pressure on the stack 15.

The slim bar 11 is extremely durable and allows for maximum live area for printed media and other presentation material. Inserted material 15 is instantly secured once they are bound beneath the bar 11, enabling immediate and easy page turning with this hole-less editable binding system 10. There is also less tearing as seen with ring-bound systems because of its perfect-bound attribute. Depending upon the thickness of the cover, fabric and/or paper stock, pages will lie open without flipping back unlike many other binder systems. The system's simple unobtrusive design is less distracting from aesthetic components of a portfolio including its contents. Its structure also aids in weighing down the paper stack 15, so it is stable on a table or desk as pages are turned and also wind resistant. It can also anchor a hinge, if a protective or decorative hard cover addition is desired.

Unlike a bookbinding jig, no screw or bolt nuts protrude, so its low-profile design won't harm users or table surfaces under normal use. It easily fits into cases, bags or larger portfolios. Various thickness of backing boards 16 can be interchanged to allow for various cosmetic design options and/or for purposes of adding or reducing space in order to accommodate more or less paper or other flat media 15. Books created with this system can be easily shelved or stacked for shipping, filing or archival purposes. It allows for any inserts 15 that can be placed between the bar 11 including fabrics or other flat media that may include thicker materials attached to the inserted sheets such as computer disks, novelty items, product samples, booklets, etc.

The system does not require the use of any adhesives and can be made entirely of recycled materials.

Variations

Dense metal, polymer, bone and wood materials can be employed for the dense bar 11.

A corresponding dense bar to bar 11 on the rear side of the paper or fabric stack 15 may be used in place of the backing board 16 for a tighter binding.

Bolt 13 and screw post 14 may be reversed and provide the same utility or function.

Rigid covers with a hinge can be connected to the bar 11 to protect the front of inserted materials 15.

Varying threaded bolts and screw post lengths to accommodate for more or less papers in the stack.

Figure 6:
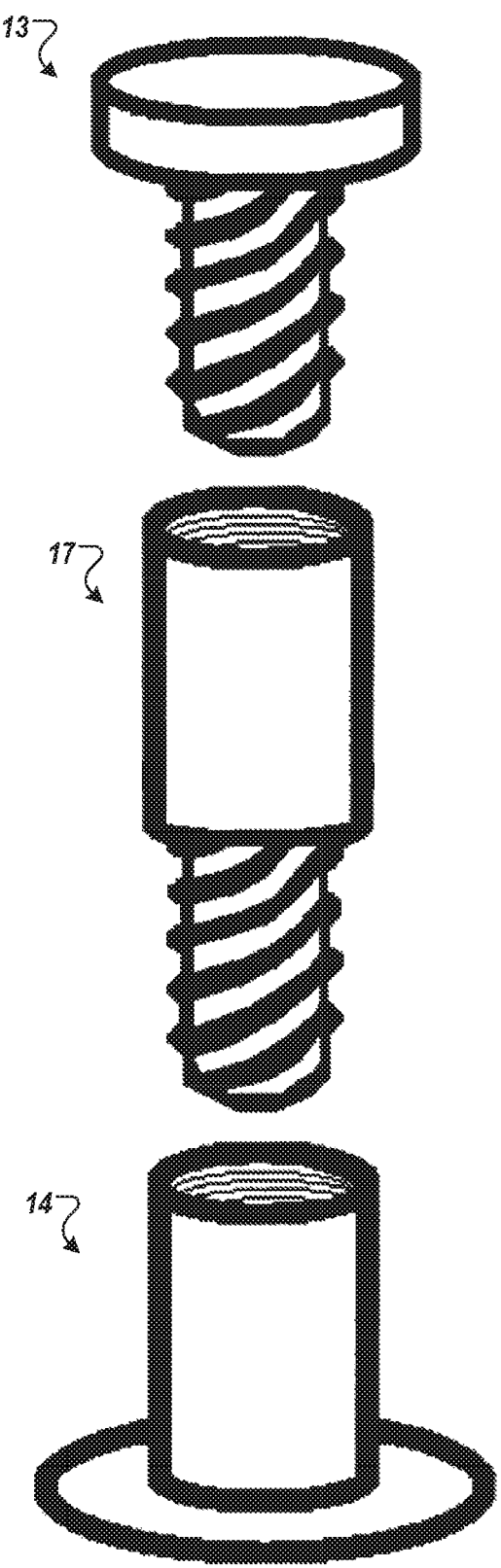
FIG. 6 shows an exploded perspective view of a threaded bolt 13, a screw post barrel extender 17, and a screw post 14.

As shown in FIG. 6 screw post barrel extenders 17 may be used between threaded bolt 13 and screw post 14 for extra thick stacks of materials.

Additional fasteners that enter the through-holes at either end of the dense bar to create an inward pressure on the inserted material.

I claim:

1. A hole-less portfolio binding system comprising:
    a single narrow, dense bar consisting of:
        an upper bar surface comprising a first end and a second end;
        a lower bar surface, wherein a first bar channel hole extends perpendicularly from the first end to the lower bar surface and a second bar channel hole extends perpendicularly from the second end to the lower bar surface such that the distance between the first and second bar channel holes is greater than a width of a media;
    a rigid rectangular backing board consisting of:
        an upper board surface comprising a first corner and a second corner, wherein the upper board surface is substantially larger than the lower bar surface and the upper board surface is larger than a lower media surface of the media to be gripped between the upper board surface and the lower bar surface;
        a lower board surface, wherein a first backing-board through-hole extends perpendicularly from the first corner to the lower board surface and a second backing-board through-hole extends perpendicularly from the second corner to the lower board surface;
    a fastening system consisting of:
        a first top threaded bolt having a low profile head removably inserted through the first bar channel hole;
        a second top threaded bolt having a low profile head removably inserted through the second bar channel hole;
        a first screw post having a low profile flange removably inserted through the first backing-board through-hole, wherein the first screw post engages with the first top threaded bolt to draw the first end toward the first corner and the first screw post is reversible with the first top threaded bolt;
        a second screw post having a low profile flange removably inserted through the second backing-board through-hole, wherein
        the second screw post engages with the second top threaded bolt to draw the second end toward the second corner,
        the second screw post is reversible with the second top threaded bolt;
        wherein the heads and flanges of the bolts and screw posts directly engage one of the bar or the backing board, respectively, to grip the media between the lower bar surface and the upper board surface.

2. The hole-less portfolio binding system of claim 1, wherein
    each of the first backing-board through-hole, the second backing-board through-hole, the first bar channel hole, the second bar channel hole has a hole diameter,
    each of the first top threaded bolt and the second top threaded bolt has a bolt head diameter that is larger than the hole diameter, and
    each of the first screw post and the second screw post has a screw head diameter that is larger than the hole diameter.

3. The hole-less portfolio binding system of claim 1, wherein the bar has a length similar to a length of the upper board surface and the media is to be firmly gripped between the lower bar surface and the upper board surface without adhesive, wherein the first top threaded bolt, the second top threaded bolt, the first screw post, and the second screw post do not pass through the media.

4. The hole-less portfolio binding system of claim 1, wherein the low profile head of the first top threaded bolt does not substantially protrude from the upper bar surface when the first top threaded bolt is engaged with the first screw post.

5. The hole-less portfolio binding system of claim 1, wherein the low profile flange of the first complementary screw post does not substantially protrude from the lower board surface when the first screw post is engaged with the first top threaded bolt.

6. The hole-less portfolio binding system of claim 1, wherein a screw post barrel extender is engaged between the first top threaded bolt and the first complementary screw post.

7. The hole-less portfolio binding system of claim 1, wherein a hinge of a protective or decorative hard cover addition is removably connected to the bar.

8. The hole-less portfolio binding system of claim 1, wherein a hinge of a protective or decorative hard cover addition is anchored by the bar.

9. The hole-less portfolio binding system of claim 1, wherein the upper bar surface and the lower bar surface are flat and parallel.

10. The hole-less portfolio binding system of claim 1, wherein the media comprises at least one paper leaf.

11. The hole-less portfolio binding system of claim 1, wherein the media comprises at least one piece of fabric.

12. The hole-less portfolio binding system of claim 1, wherein
- the first top threaded bolt comprises a first bolt head that is uncovered,
- the first complementary screw post comprises a first post head that is uncovered,
- the second top threaded bolt comprises a second bolt head that is uncovered, and
- the second complementary screw post comprises a second post head that is uncovered.

13. The hole-less portfolio binding system of claim 1, wherein each of the first bar channel hole and the second bar channel hole has a bar channel hole diameter, each of the first backing-board through-hole and the second backing-board through-hole has a board through-hole diameter, and the bar channel hole diameter is equal to the board through-hole diameter.

14. The hole-less portfolio binding system of claim 1, wherein the media is located on the upper board surface between the first top threaded bolt and the second top threaded bolt.

\* \* \* \* \*